(12) United States Patent
Sasaki

(10) Patent No.: US 8,358,439 B2
(45) Date of Patent: Jan. 22, 2013

(54) COLOR GAMUT SURFACE GENERATING APPARATUS AND COMPUTER-READABLE MEDIUM

(75) Inventor: Makoto Sasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 692 days.

(21) Appl. No.: 12/510,731

(22) Filed: Jul. 28, 2009

(65) Prior Publication Data

US 2010/0201999 A1 Aug. 12, 2010

(30) Foreign Application Priority Data

Feb. 11, 2009 (JP) .................................. 2009-029201

(51) Int. Cl.
*G06F 15/00* (2006.01)
*H04N 1/40* (2006.01)
*G06K 9/00* (2006.01)
(52) U.S. Cl. ............................ 358/1.9; 358/2.1; 382/162
(58) Field of Classification Search ........... 382/162–167
See application file for complete search history.

(56) References Cited

U.S. PATENT DOCUMENTS

| 6,100,999 | A | 8/2000 | Ikegami | |
|---|---|---|---|---|
| 2003/0002061 | A1* | 1/2003 | Van de Capelle | 358/1.9 |
| 2004/0100640 | A1* | 5/2004 | Saito | 358/1.1 |
| 2005/0062992 | A1 | 3/2005 | Kishimoto et al. | |
| 2007/0165252 | A1* | 7/2007 | Sasaki | 358/1.9 |

FOREIGN PATENT DOCUMENTS

| JP | A-10-262157 | 9/1998 |
|---|---|---|
| JP | A-2001-136401 | 5/2001 |
| JP | A-2002-84434 | 3/2002 |
| JP | A-2003-8912 | 1/2003 |
| JP | A-2005-63093 | 3/2005 |

OTHER PUBLICATIONS

Oct. 10, 2012 Office Action issued in Japanese Patent Application No. 2009-029201 (with English Translation).

* cited by examiner

*Primary Examiner* — Twyler Haskins
*Assistant Examiner* — Barbara Reinier
(74) *Attorney, Agent, or Firm* — Oliff & Berridge, PLC

(57) ABSTRACT

A color gamut surface generating apparatus includes a vertex generating unit and a gamut surface generating unit. A device-dependent color space has axes of (i) four basic colors including black and (ii) at least one extra color which are used in color output by an output device. The vertex generating unit generates, in the device-dependent color space, vertices of each of sub-surfaces constituting a surface of a color gamut by selecting (a) at least one color gamut each of which is output by the output device using a combination of three of the basic colors and one, corresponding to each color gamut, of the at least one extra color, and (b) a color gamut which is output by the output device using the four basic colors. The gamut surface generating unit generates surface points existing on the surface of the color gamut constituted by the vertices.

20 Claims, 17 Drawing Sheets

FIG. 3

| Vertices in CMYKR space | | | | |
|---|---|---|---|---|
| C | M | Y | K | R |
| 0 | 0 | 0 | 0 | 0 |
| 100 | 0 | 0 | 0 | 0 |
| 100 | 100 | 0 | 0 | 0 |
| 0 | 100 | 0 | 0 | 0 |
| 0 | 100 | 0 | 0 | 100 |
| 0 | 0 | 0 | 0 | 100 |
| 0 | 0 | 100 | 0 | 100 |
| 0 | 0 | 100 | 0 | 0 |
| 100 | 0 | 100 | 0 | 0 |
| 0 | 100 | 100 | 0 | 100 |
| 100 | 0 | 0 | 100 | 0 |
| 100 | 100 | 0 | 100 | 0 |
| 0 | 100 | 0 | 100 | 0 |
|  | 100 | 0 | 100 | 100 |
| 0 | 100 | 100 | 100 | 100 |
| 0 | 0 | 100 | 100 | 100 |
| 0 | 100 | 100 | 100 | 0 |
| 0 | 0 | 100 | 100 | 0 |
| 100 | 0 | 100 | 100 | 0 |
| 100 | 100 | 100 | 100 | 0 |

# COLOR GAMUT SURFACE GENERATING APPARATUS AND COMPUTER-READABLE MEDIUM

CROSS-REFERENCE TO RELATED APPLICATIONS

This application is based on and claims priority under 35 USC 119 from Japanese Patent Application No.2009-29201 filed on Feb. 11, 2009.

BACKGROUND

1. Technical Field

The present invention relates to a color gamut surface generating apparatus and a computer-readable medium storing a program that causes a computer to generate a color gamut surface.

2. Related Art

When color management is performed between output apparatuses for outputting color images, such as printing apparatuses and/or display apparatuses, it is necessary to fit given colors in a color gamut representing a color reproduction range of each output apparatus. A process of fitting colors in a color gamut, that is, a process of converting colors which cannot be reproduced into colors which can be reproduced is commonly called "color gamut mapping process".

FIG. 14 is a conceptual view of the color gamut mapping process. FIG. 14 shows a color gamut in the LAB space, which is a standardized color space having no dependency on an output apparatus, where a color gamut of an output apparatus is indicated by a solid line, and a range of given colors (given color gamut) is indicated by a dashed line. Of colors in the color gamut indicated by the dashed line, colors which are outside of the color gamut indicated by the solid line cannot be reproduced by the output apparatus. Accordingly, as indicated by arrows in the figure, the colors shown outside of the color gamut indicated by the solid line are converted into colors belonging to the color gamut indicated by the solid line. Such a conversion process allows the color gamut indicated by the dashed line to be compressed (mapped) into the color gamut indicated by the solid line.

When such a color gamut mapping process is performed, it is first determined as to whether or not given colors can be reproduced in the output apparatus. Then, at least colors which cannot be reproduced are converted into colors which can be reproduced. Here, in order to determine whether or not the given colors can be reproduced in the output apparatus, a limit in color which can be reproduced in the output apparatus has to be acquired in advance, and it is necessary to quantify the surface (outline, contour) of the color gamut of the output apparatus.

FIGS. 15A and 15B are explanatory views of examples of a color gamut surface. For example, the color gamut surface of an output apparatus outputting a color image with the three colors of C (cyan), M (magenta) and Y (yellow) corresponds to the surface of a cube or a rectangular parallelepiped in a CMY color space as shown in FIG. 15A (in FIG. 15A, the surface of the cub has six sub-faces). A result of converting points on the surface of the cube or rectangular parallelepiped into the LAB color space is roughly shown in FIGS. 15A and 15B. In this case, since both the CMY color space as a conversion source and the LAB color space as a conversion destination are three-dimensional, one-to-one mapping can be performed. Accordingly, by converting points on the color gamut surface in the CMY color space into those in the LAB color space, the color gamut surface is expressed in the LAB color space without being changed its skeleton (primitive) although its shape is distorted. For example, if the conversion source is a different three-dimensional color space such as an RGB color space and if the conversion destination is also a three-dimensional color space, such a mapping relationship can be established. In addition, for example, if the output apparatus is a color printer, the conversion of colors in the CMY color space into those in the LAB color space may be performed in the following manner. That is, the color printer outputs color patches composed of combinations of C, M and Y, and then the color conversion is calculated based on a correspondence relationship between the combinations of C, M and Y and L*, a* and b* which are colorimetric values.

In this manner, when both color spaces of the conversion source and the conversion destination are three-dimensional, a color gamut surface is obtained according to the one-to-one mapping relation. However, if the color space of the conversion source is four-dimensional, for example, if the output apparatus uses K (black) in addition to C, M and N; conversion of a four-dimensional color space into a three-dimensional color space is performed. In this case, a many-to-one mapping relationship is mathematically established. Accordingly, the conversion using the one-to-one mapping shown in FIGS. 15A and 15B cannot be applied as it is.

JP 2003-8912 A and JP 2005-63093 A (corresponding to US 2005/0062992 A) describe methods of converting a color gamut surface in a four-dimensional color space such as CMYK color space into a three-dimensional color space such as LAB color space. FIG. 16 is an explanatory view of a method of obtaining a four-color gamut surface in LAB color space. In JP 2003-8912 A, a color gamut surface of three colors of CMY is first converted into the LAB color space as shown in FIG. 16. FIG. 16 shows sub-faces of a color gamut surface for tertiary colors which are obtained by using the three colors of CMY. Hatching is drawn in one sub-surface thereof. A color gamut surface for four colors is obtained by, for example, performing a dichotomizing search between points on the shown color gamut surface for the three colors and points out of a color gamut of CMYK. Accordingly, a color gamut surface for the case where four colors are used is obtained in the LAB color space.

FIG. 17 is an explanatory view of another method of obtaining a color gamut surface using four colors in the LAB color space. In JP 2005-63093 A, a color gamut surface is theoretically defined in CMYK color space. After points constituting a color gamut surface in the CMYK color space are obtained, a color gamut in LAB color space is obtained by converting the points (four dimension) on the color gamut surface into points (three dimension) in the LAB color space. The color gamut surface in the CMYK color space is defined by sub-faces shown in FIGS. 17A and 17B. In these figures, assuming that each component has a value between 0% and 100%, the characters "C", "M", "Y" and "K" in the figure indicate points of 100%, in the respective components. Also, when two or more symbols are combined, it represents 100% in the respective components. For example, CM stands for C=M=100%, MYK stands for M=Y=K=100%, and CMYK stands for C=M=Y=K=100%. By converting the sub-faces shown in FIGS. 17A and 17B into the LAB color space, a color gamut surface is obtained as shown in FIG. 17C. In addition, for example, if the output apparatus is a color printer, such conversion is calculated in the following manner. That is, the color printer outputs color patches composed of combinations of C, M, Y and K, and the conversion is calculated based on a correspondence relationship (color conversion model) between the combinations of C, M, Y and K and L*, a* and b*, which are colorimetric values.

Some output apparatuses may put a limitation on each color component or the sum of the color components. For example, a CMY color space may be converted into the LAB color space after the cube or rectangular parallelepiped shown in FIG. 15A is partially deleted and deformed according to the limitation. In this case, the order in which points are arranged in the CMY color space is preserved (maintained) in the LAB color space. When the shape of a color gamut in CMYK color space is controlled according to the limitation, it is determined as to whether or not the shape is established as a color gamut surface in LAB color space depending on how to define K. For example, in the case where there is a limitation of 280% on the total sum of CMYK as a limitation on the total sum of color components (hereinafter referred to as "total sum limitation"), C=M=Y=90% and K=30% do not meet the total sum limitation. However, C=M=Y=30% and K=90% meet the total sum limitation. Accordingly, how to define K determines whether or not a color gamut surface meets the total sum limitation in the LAB color space.

If some colors among the colors on the sub-faces shown in FIGS. 17A and 17B don't meet the total sum limitation, JP 2005-63093 obtains colors, meeting the total sum limitation, on the color gamut surface by fixing K or one color component having a larger value than the other components and decreasing the other components with their ratio being maintained.

SUMMARY

According to an aspect of the invention, a color gamut surface generating apparatus includes a vertex generating unit and a gamut surface generating unit. A device-dependent color space has axes of (i) four basic colors including black and (ii) at least one extra color which are used in color output by an output device. The vertex generating unit generates, in the device-dependent color space, vertices of each of sub-surfaces constituting a surface of a color gamut by selecting (a) at least one color gamut each of which is output by the output device using a combination of three of the basic colors and one, corresponding to each color gamut, of the at least one extra color, and (b) a color gamut which is output by the output device using the four basic colors. The gamut surface generating unit generates surface points existing on the surface of the color gamut constituted by the vertices

BRIEF DESCRIPTION OF THE DRAWINGS

Exemplary embodiments of the present invention will be described in detail below based on the accompanying drawings, wherein:

FIG. 3 is an explanatory view of an example of values of respective color components at the vertices;

DETAILED DESCRIPTION

Figure 1:
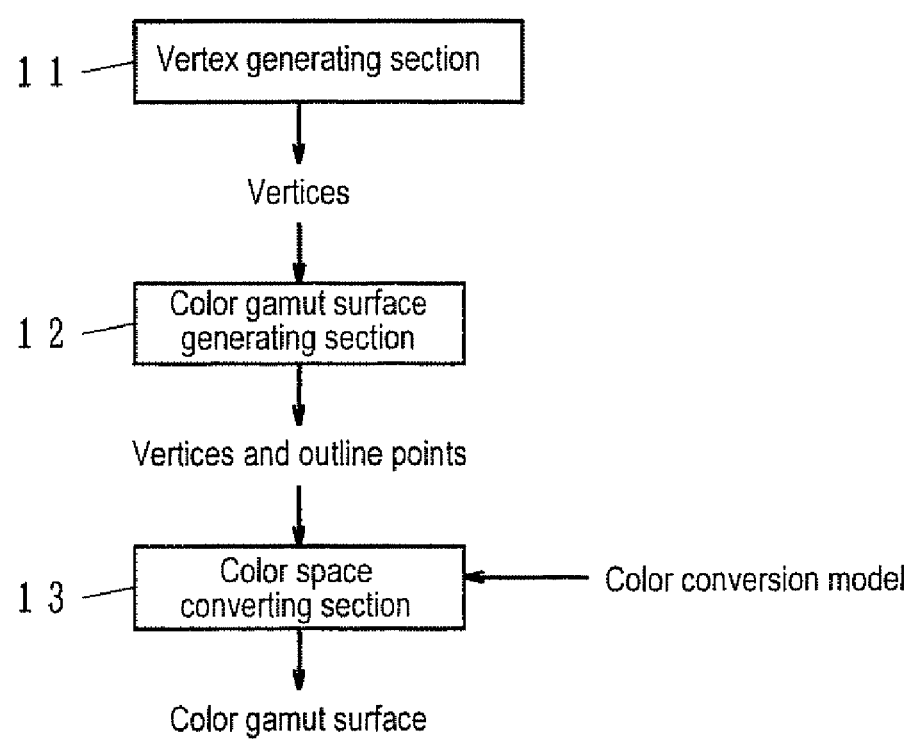
FIG. 1 is a configuration view showing a first exemplary embodiment of the present invention.

FIG. 1 is a configuration view showing a first exemplary embodiment of the present invention. In the figure, reference numerals 11, 12 and 13 respectively denote a vertex generating section, a color gamut surface generating section and a color space converting section. In the following description, four basic colors including K (black) and one or more extra colors are used when an output apparatus outputs a color image. Here, C, M and Y are primary colors, and basic colors include these primary colors and K. Extra colors include R or one to three out of O, G and B. Two colors of O and G or three colors of R, G and B are frequently used. Of course, extra color(s) may include violet and/or other designated colors so long as their color gamut can be expanded. The basic colors are not limited to CMYK but may be RGBK or the like.

The vertex generating section 11 generates vertices of sub-faces constituting a surface of a color gamut which is output by an output device using (i) a combination of three basic colors and one extra color or (ii) the four basic colors in a device-dependent color space having axes (color components) of basic colors and extra colors which are used by the output device. Details on this will be described later. A skeleton (base) for representing a basic state of the shape of the color gamut surface is formed by the generated vertices. If various limitations, including a total sum limitation and a one color max value limitation by which the respective color components are limited (for example, C (cyan)≦80%), are imposed on the output device, each vertex is generated to meet the limitations imposed on each vertex.

When the vertices are generated in the vertex generating section 11, combinations of two or more extra colors are not considered. In addition, if one extra color is used, a basic color being complementary to the one extra color is excluded because the color gamut is not expected to be expanded when the complementary basic color is added. Accordingly, even when five or more colors are used, all of the vertices generated by the vertex generating apparatus 11 are represented by four colors or less.

The color gamut surface generating section 12 generates surface points existing on the surface of the color gamut constituted by the vertices generated by the vertex generating section 11. When the vertices represented by four colors or less are used, a color gamut surface is established by sub-faces each constituted of four vertices, as can be seen from examples to be described later. Accordingly, surface points in each sub-face of the color gamut surface may be generated from the four vertices constituting each sub-face. For example, surface points may be generated from the four vertices by interpolation.

The color space converting section 13 converts the vertices generated by the vertex generating section 11 and the surface points generated by the color gamut surface generating section 12 into points in a conversion destination color space which is a color space other than the device-dependent color space. The conversion destination color space may be an device-independent color space such as the LAB color space or the LUV color space. The conversion may be performed using a color conversion model that associates colors in a conversion source device-dependent color space with colors in a conversion destination color space. For example, a color conversion model described in JP Hei.10-262157 A (corresponding to U.S. Pat. No. 6,100,999) or JP 2002-84434 A, a neural network, a Neugebauer model, etc. may be used. Any color conversion coefficients may be used so long as they are calculated by a statistical process using real data which can detect the correspondence relationship between a device color space and a conversion destination color space. Alternatively, predetermined and fixed color conversion coefficients may be used. In addition, the first exemplary embodiment may be configured without the color space converting section 13 being provided, and vertices and surface points in a device-dependent color space may be output as they are.

Hereinafter, the first exemplary embodiment of the present invention will be further described with reference to examples. As described above, the vertex generating section 11 generates the vertices of the sub-faces constituting the surface of the color gamut in the device-dependent color space. At that time, the vertices are generated using four colors, for example, using a combination of three basic color colors and one extra color or four basic colors. Accordingly, combinations including two or more extra colors are not used. In addition, in cases where one extra color is used, one basic color, for example, a basic color complementary to the one extra color, is not used. Accordingly, even when five or more colors are used, all of the vertices generated by the vertex generating apparatus 11 are represented by four colors or less, and vertices forming a color gamut in this range are obtained.

Figure 2A:
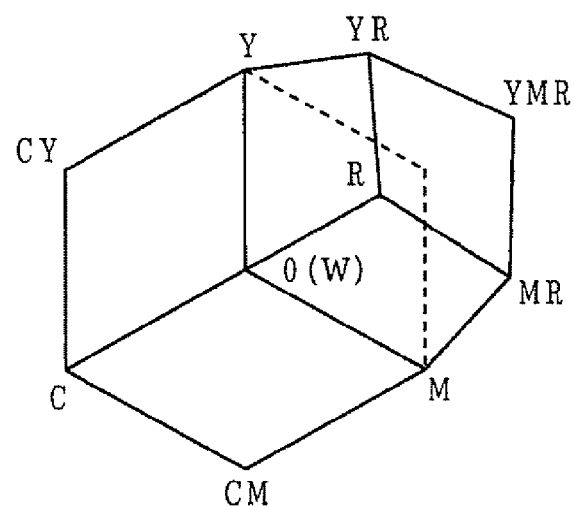
FIGS. 2A and 2B are explanatory views showing an example of vertices generated in a CMYKR color space.
Figure 2B:
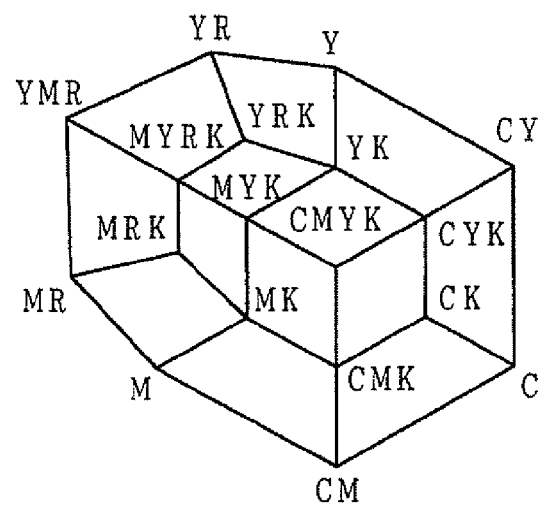
Figure 17A:
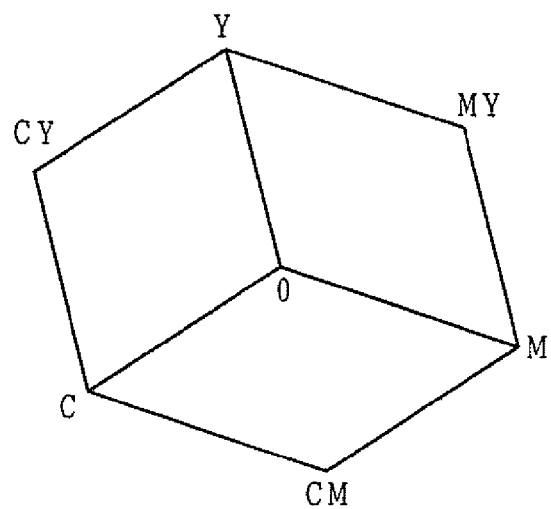
FIGS. 17A to 17C are explanatory views showing another method of obtaining a color gamut surface using four colors in the LAB color space.
Figure 17B:
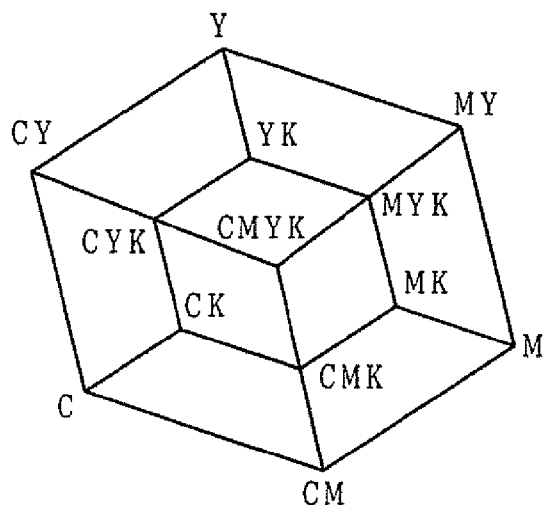
Figure 17C:
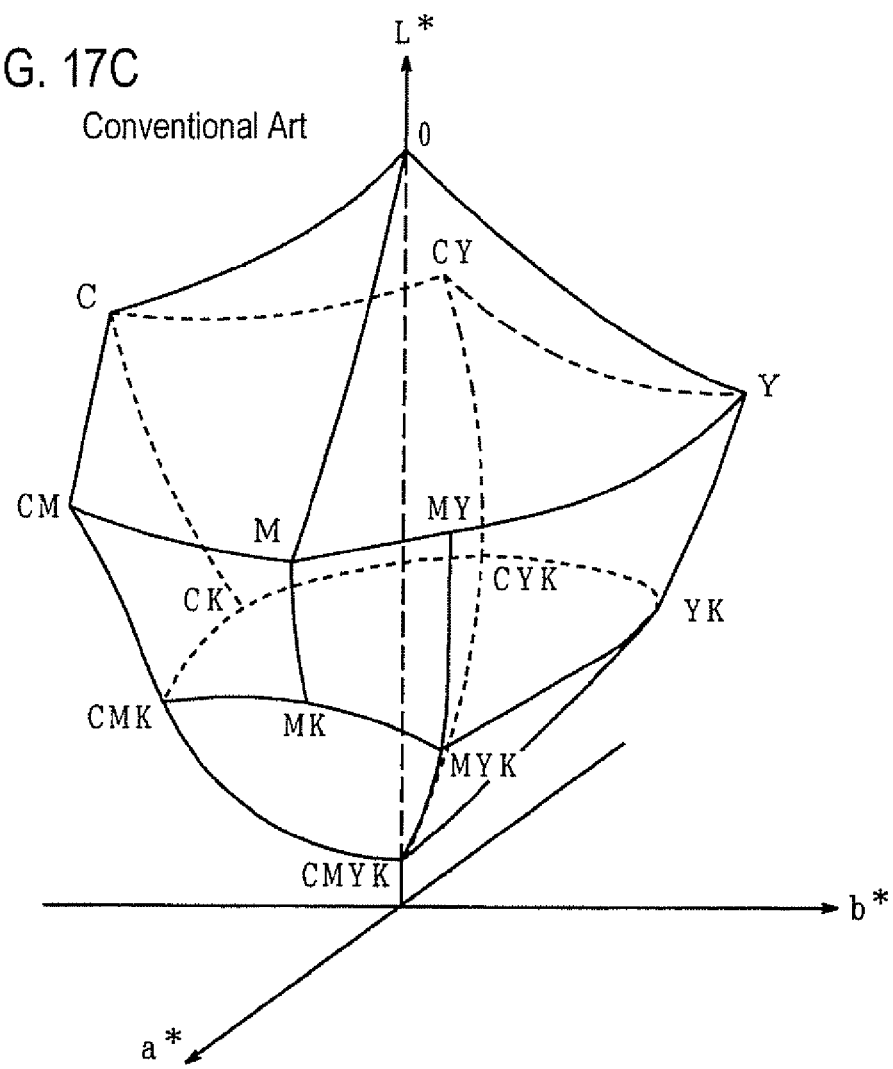

FIGS. 2A and 2B are explanatory views showing an example of vertices generated in a CMYKR color space. FIG. 3 is an explanatory view of an example of values of the respective color components at the vertices. Even when the output device uses five or more colors, a color gamut can be simply represented by considering vertices using any four colors. A color gamut surface constituted by basic colors, which does not include any extra color, is theoretically expressed, for example, as shown in FIGS. 17A and 17B. Using this expression method, a color gamut surface in a CMYKR color space is expressed as shown in FIGS. 2A and 2B. In FIGS. 2A and 2B, each of the symbols of C, M, Y, K and R represents that the color component corresponding to each symbol is 100% and that the other color components are 0%. For example, YR in FIG. 2B represents that Y=R=100% and C=M=K=0%.

For the CMYKR color space, the vertices generated by the vertex generating section 11 include 0 (white), C, M, Y, K, R, CM, CY, YR, MR, CK, MK, YK, CMK, CYK, MYK, YMR, YRK, MRK, MYRK and YMCK. FIG. 3 shows an example of values of the respective color components at the generated vertices. These values correspond to vertices constituted by four colors of CMYK and vertices constituted by four colors of MYKR. For example, YMCKR which uses five colors and RC, MRC, YRC and so on, including R and C being complementary to R, are not generated as vertices. In addition, since the vertex MY for four colors is included in the color gamut, which is generated using the extra color R, the vertex generating section II does not generate this vertex MY.

Figure 4A:
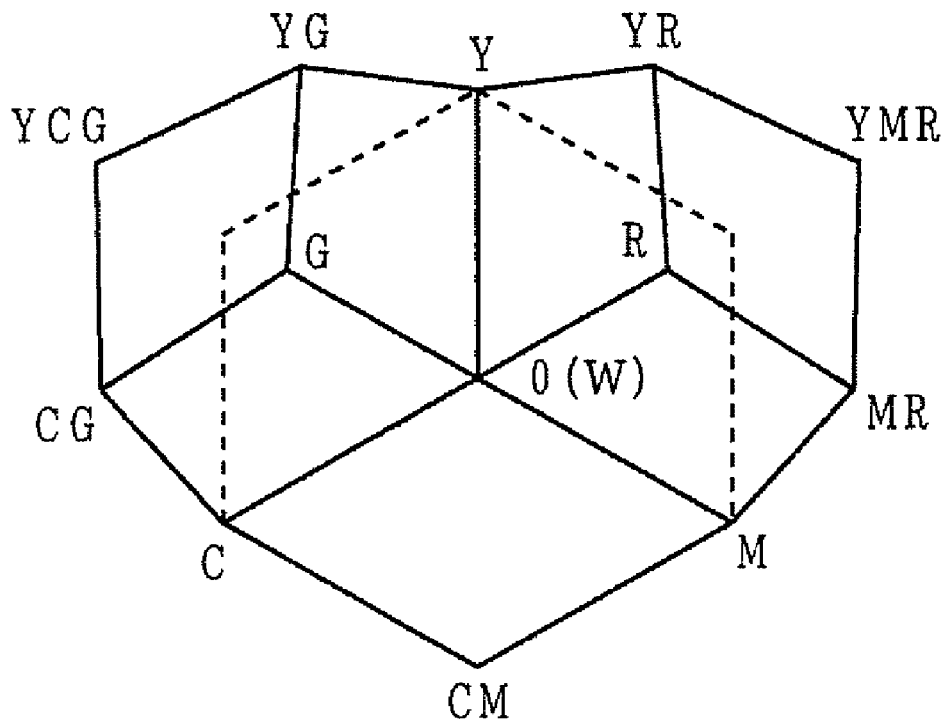
FIGS. 4A and 4B are explanatory views showing an example of vertices generated in a CMYKRG color space.
Figure 4B:
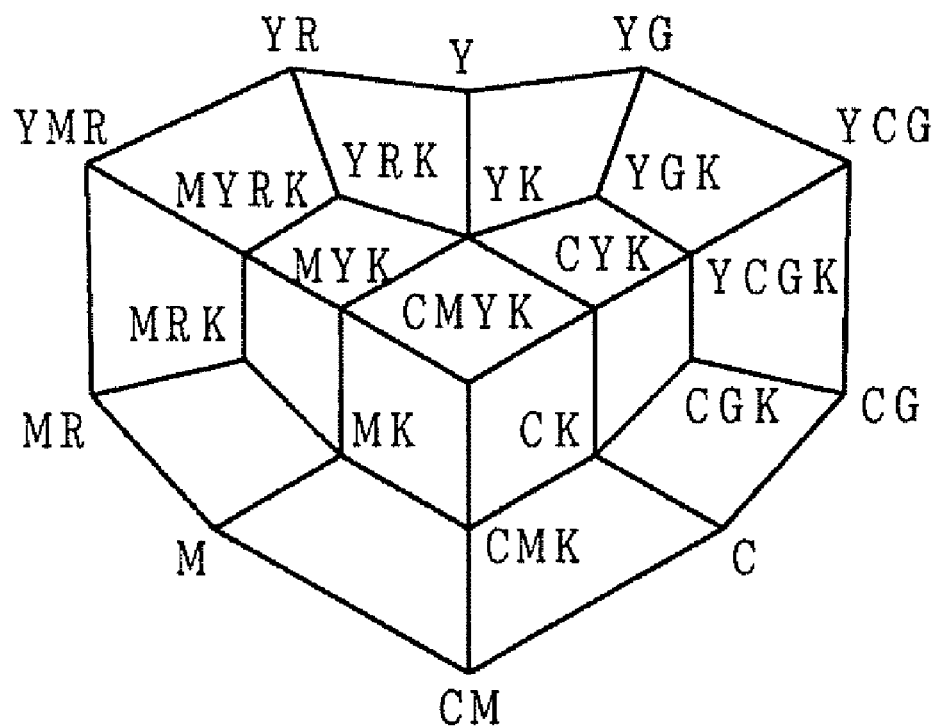

FIGS. 4A and 4B are explanatory views of an example of vertices generated in a CMYKRG color space. Vertices in the CMYKRG color space include vertices constituted by four colors of CMYK, vertices constituted by four colors of MYKR including the extra color R, and vertices constituted by four colors of CYKG including the extra color G. Specifically, the vertices are 0 (white point), C, M, Y, K, R, G, CM, YR, MR, YG, CG, CK, MK, YK, CMK, CYK, MYK, YMR, YRK, MRK, YCG, YGK, CGK, MYRK, YCGK and CMYK. In these vertices, the extra colors R and G are not simultaneously included, R and C being complementary to R are not simultaneously included, and G and M being complementary to G are not simultaneously included. In addition, since a vertex MY for four colors is included in the color gamut when the extra color R is used, and since a vertex CY for four colors is included in the color gamut when the extra color G is used, the vertex generating section 11 does not generate these vertices MY and CY. This example can be also applied to the case where a extra color O (orange) is used instead of the extra color R.

Figure 5A:
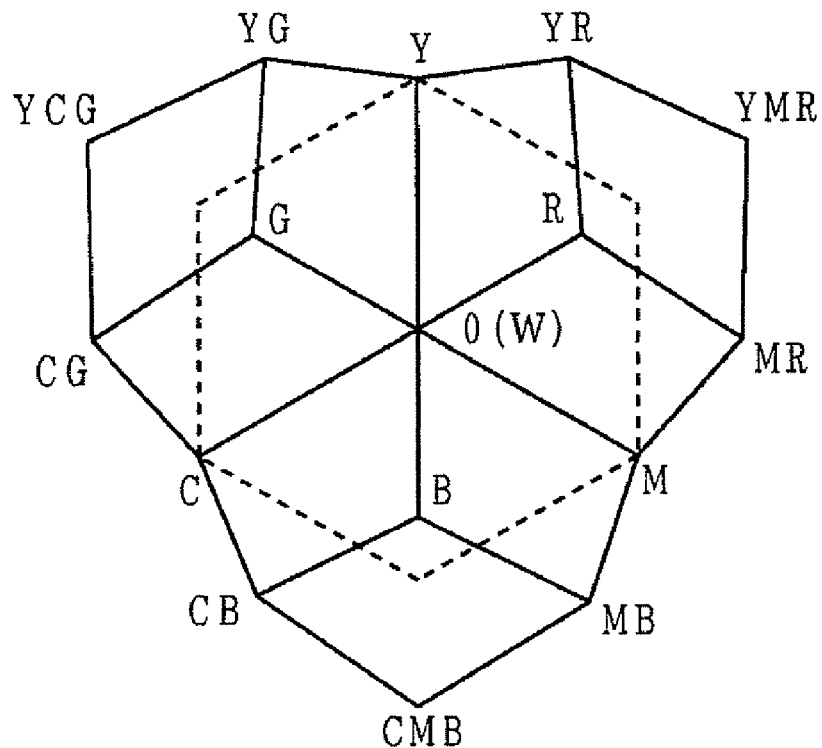
FIGS. 5A and 5B are explanatory views showing an example of vertices generated in a CMYKRGB color space.
Figure 5B:
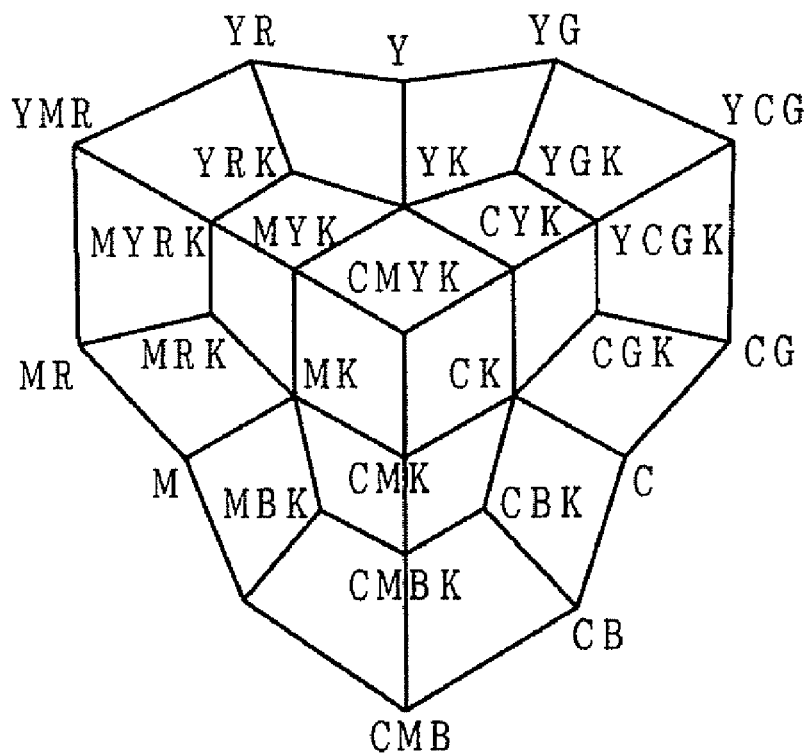

FIGS. 5A and 5B are explanatory views of an example of vertices generated in a CMYKRGB color space. Vertices in CMYKRGB color space include vertices constituted by four colors of CMYK, vertices constituted by four colors of MYKR including the extra color R, vertices constituted by four colors of CYKG including the extra color G, and vertices constituted by four colors of CMKB including the extra color B. Specifically, the vertices are 0 (white point), C, M, Y, K, K, G, B, YR, MR, YG, CG, CB, MB, CK, MK, YK, CMK, CYK, MYK, YMR, YRK, MRK, YCG, YGK, CGK, CMB, CBK, MBK, MYRK, YCGK, CMBK and CMYK. In these vertices, two or more of the extra colors R, G and B are not simultaneously included, R and C being complementary to R are not simultaneously included, G and M being complementary to G are not simultaneously included, and B and Y being complementary to B are not simultaneously included. In addition, since the vertex MY for four colors is included in the color gamut when the extra color R is used, since the vertex CY for four colors is included in the color gamut when the extra color G is used, and since the vertex CM for four colors is included in the color gamut when the extra color B is used, the vertex generating section 11 does not generate these vertices MY, CY, and CM.

Figure 6A:
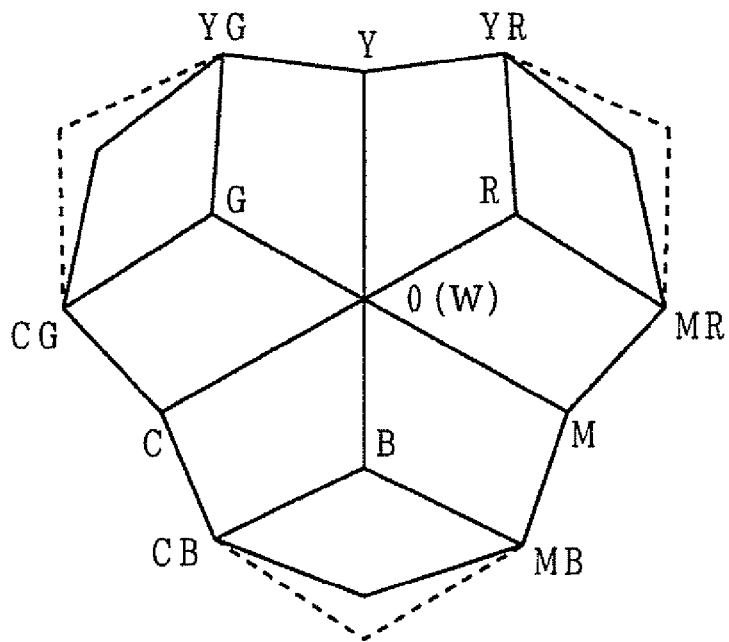
FIGS. 6A and 6B are explanatory views showing an example of vertices generated in a CMYKRGB color space when a total sum limitation is imposed.
Figure 6B:
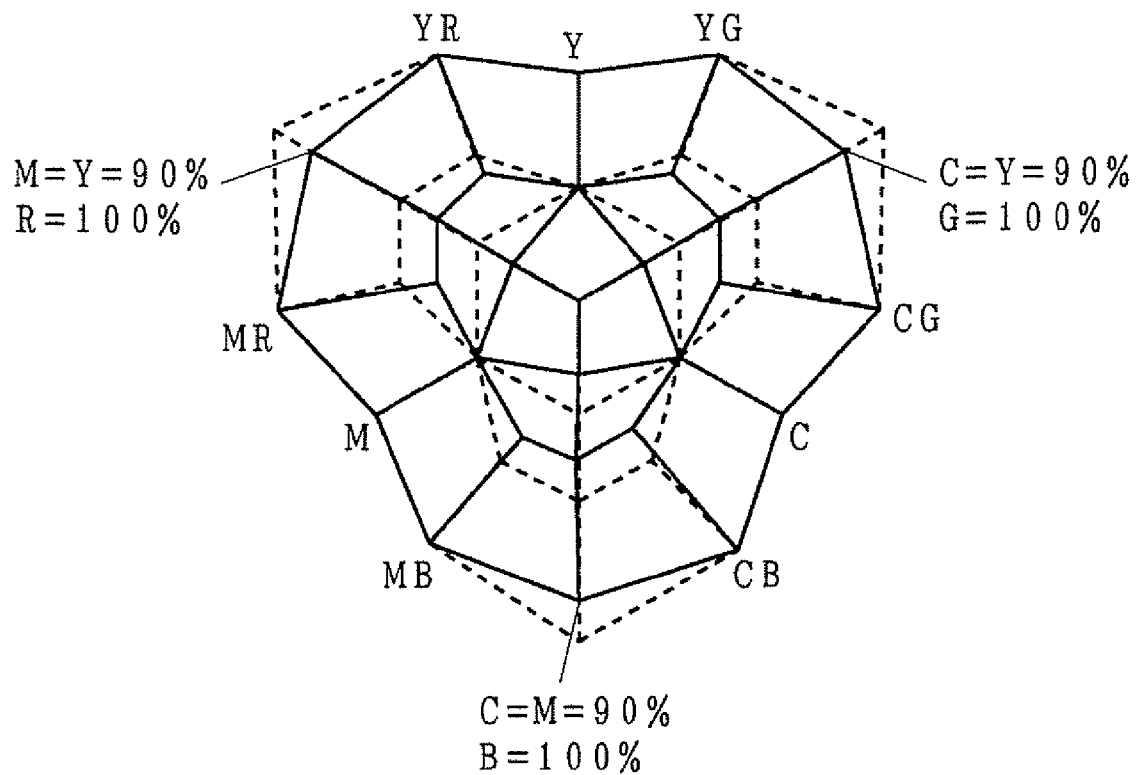

FIGS. 2A, 2B, 4A, 4B, 5A and 5B show the cases where limitations, such as a total sum limitation, imposed on the output device are not considered. In other words, these figures show the cases where a total sum limitation is not imposed, such as a case where a total sum limitation exceeds 400%. If the total sum limitation is less than 400%, vertices are generated to meet the total sum limitation. FIGS. 6A and 6B are explanatory views showing an example of vertices generated in a CMYKRGB color space when a total sum limitation is imposed. For example, if the total sum limitation is 280%, since vertices of 0 (white point), C, M, Y, K, R, G, B, YR, MR, YG, CG, CB, MB, CK, MK and YK in FIGS. 5A and 5B meet the total sum limitation, they are set as vertices as they are. Vertices of CMK, CYK, MYK, YMR, YRK, MRK, YCG, YGK, CGK, CMB, CBK and MBK do not meet the total sum limitation in their current state since the total sum of each of those vertices is 300%. In addition, vertices of MYRK, YCCK, CMBK and CMYK do not meet the total sum limitation in their current state since the total sum of each of those vertices is 400%. Accordingly, vertices meeting the total sum limitation of 280% are generated.

For example, for YCG exemplified in FIGS. 6A and 6B, Y+C+G=280% if Y=C=90% and G=100%. In this manner, as a method of obtaining vertices meeting the total sum limitation, it is considered to set a extra color or K as 100% and decrease the other color components by the same amount as in this example. Alternatively, all color components may be decreased by the same amount.

By generating the vertices meeting the total sum limitation in this manner, as compared to before the total sum limitation is imposed as indicated by dashed lines in FIG. 6A and 6B, a color gamut changes toward the inner side, and its shape is changed as indicated by solid lines in FIGS. 6A and 6B. However, an order in which the vertices are arranged or their mutual relationships are not changed. In addition, although CMYK shown in FIGS. 5A and 5B is shown in FIGS. 6A and 6B as if its position is not changed, this is for convenience sake of drawing. For example, CMYK may be a color of C=M=Y=60% and K=100%.

In addition to the total sum limitation, for example, limitations may be imposed on each single color (one color max value limitation). For example, this limitation limits Y to be equal to or less than 80% and limits M to be equal to or less than 80%. When such a one color max value limitation is imposed, vertices may be generated to meet the one color max value limitation. For example, as described above, if one color max value limitations, such that Y is equal to or less than 80% and M is equal to or less than 80%, are imposed on Y and M, a vertex YR may have Y=80% and R=100%. A vertex YMR may have Y=M=80% and R=100%. Of course, if a one color max value limitation is imposed in combination with a total sum limitation, vertices can be generated to meet both of the limitations. Also, if another additional limitation is imposed, vertices can be generated to meet the other additional limitation.

When vertices are generated by the vertex generating section 11 in this manner, the color gamut surface generating section 12 generates surface points existing on the surface of the color gamut constituted by the generate vertices, based on the generated vertices. As shown in FIGS. 2A, 2B, 4A, 4B, 5A and 5B, the color gamut surface is established by sub-faces each of which is constituted by four vertices. Accordingly, points existing on each sub-face constituted by the four vertices may be generated as surface points. As described above, since the vertices are generated to meet various limitations imposed on the output device, the surface points generated by the color gamut surface generating section 12 also meet the various limitations.

Figure 7:
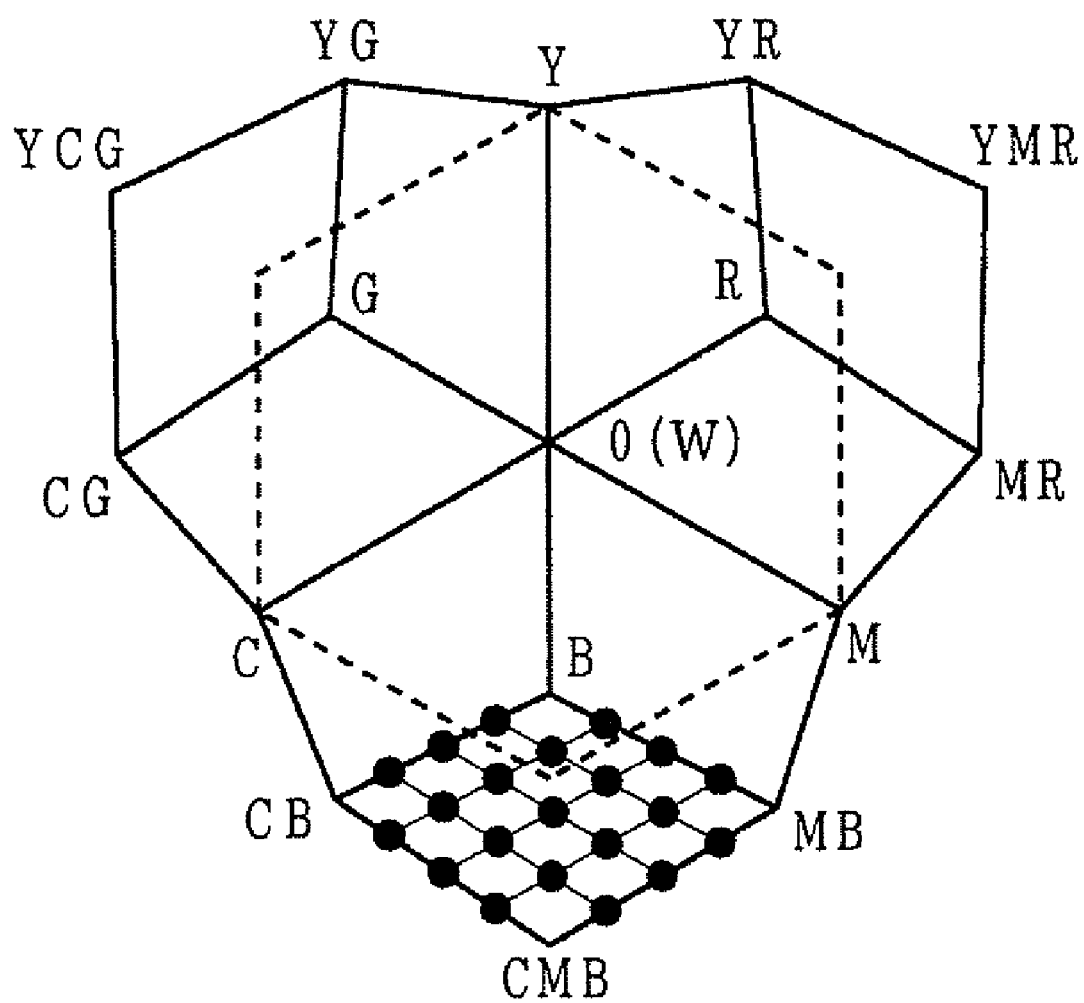
FIG. 7 is an explanatory view showing an example of surface points generated in a color gamut surface generation section.

FIG. 7 is an explanatory view showing an example of surface points generated by the color gamut surface generation section 12. FIG. 7 shows the case where surface points are generated using the vertices generated in the CMYKRGB color space shown in FIGS. 5A and 5B. As an example, when a sub-face constituted by four vertices of B, CB, CMB and MB is divided in the form of a lattice, the lattice points are set as surface points. These surface points are obtained by, for example, performing an interpolating operation based on the four vertices. In a similar way, surface points may be obtained for the other sub-faces.

Figure 8:
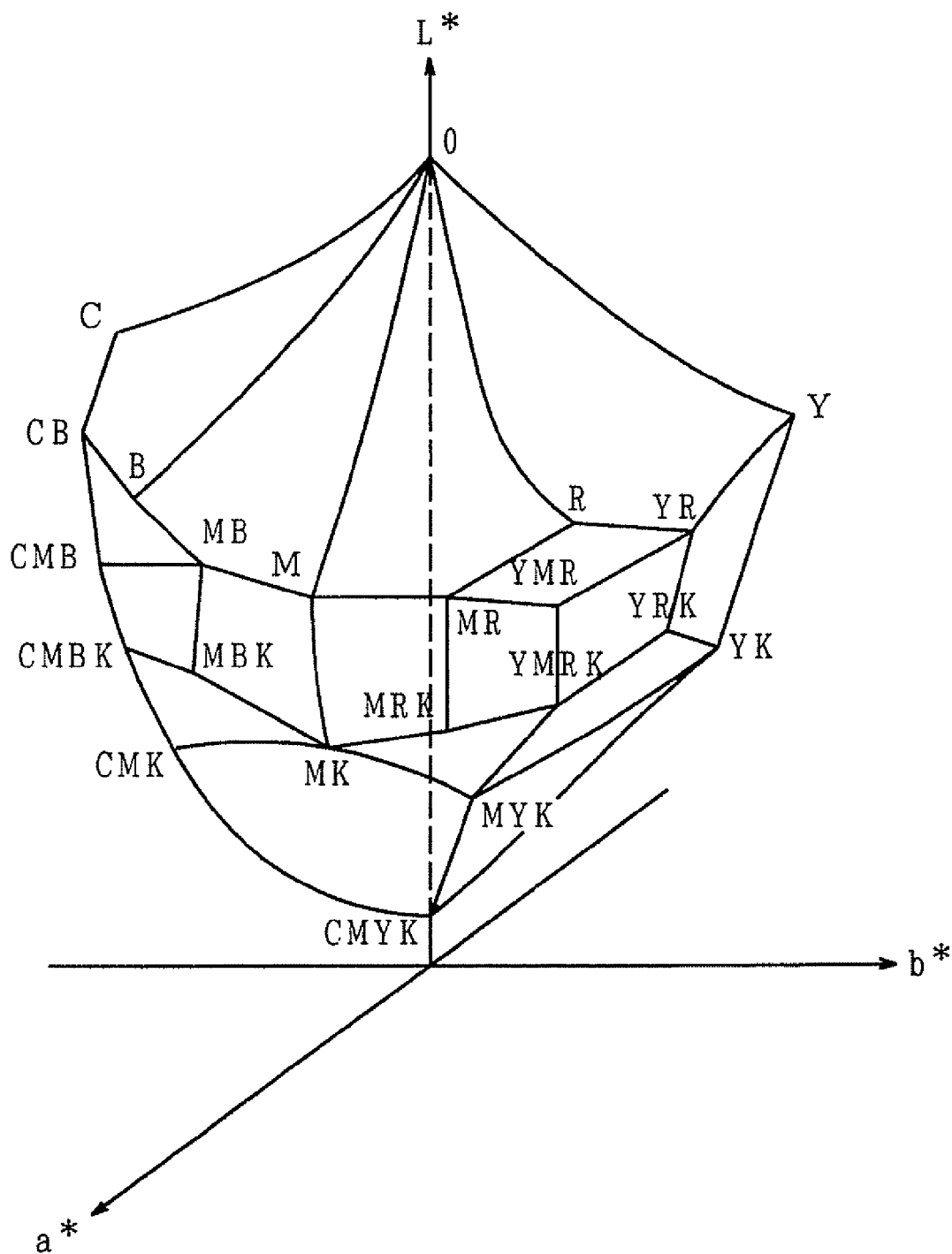
FIG. 8 is an explanatory view of an example of a color gamut converted into LAB color space.

When the surface points are obtained by the color gamut surface generating section 12, the color space converting section 13 performs a color space conversion process for the obtained surface points and the vertices generated by the vertex generating section 11. For example, the color space converting section 13 converts a device-dependent color space such as CMYKR, CMYKRG or CMYKRGB color space into a device-independent color space such as the LAB color space or the LUV color space. Such color space conversion may be performed using, for example, the color conversion model as described above. FIG. 8 is an explanatory view showing an example of a color gamut converted into the LAB color space. In this manner, the color gamut, in the device-independent color space, of the output device using five or more colors is obtained. Of course, vertices and surface points in the device-dependent color space may be output as they are without the color space conversion process being performed.

Figure 9:
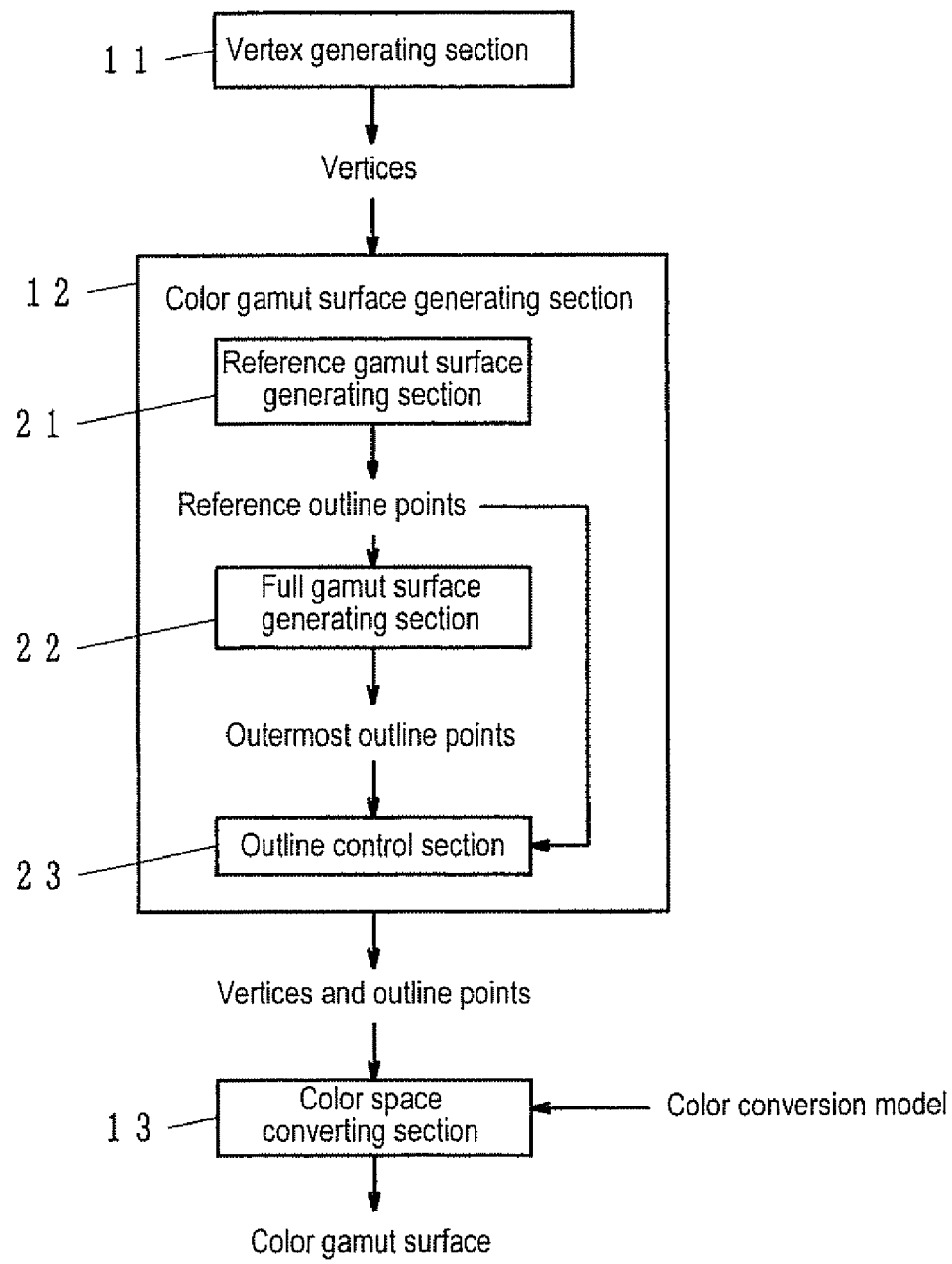
FIG. 9 is a configuration view showing a second exemplary embodiment of the present invention.

FIG. 9 is a configuration view showing a second exemplary embodiment of the present invention. In the figure, reference numerals 21, 22 and 23 respectively denote a reference outline generating section, a full gamut surface generating section and an outline control section. In the above-described first exemplary embodiment, surface points are generated by the color gamut surface generating section 12 by, for example, performing an interpolation operation based on the four vertices. This second exemplary embodiment shows an example where the color gamut surface generating section 12 generates surface points for a color gamut which is further expanded when a limitation is imposed.

In the second exemplary embodiment, the color gamut surface generating section 12 includes the reference outline generating section 21, the full gamut surface generating section 22 and the outline control section 23. The reference outline generating section 21 generates reference surface points on each of the sub-faces constituted by vertices. For example, the reference surface points may be generated by performing an interpolation operation based on four vertices. The full gamut surface generating section 22 generates full-gamut surface points which are points on the surface of the color gamut and which meet the limitations imposed on the output device, based on the reference surface points generated by the reference outline generating section 21. The outline control section 23 sets, as surface points generated by the color gamut surface generating section 12, (i) the full-gamut surface points generated by the full gamut surface generating section 22 or (ii) points between the full-gamut surface points and the reference surface points generated by the reference outline generating section 21.

Figure 10:
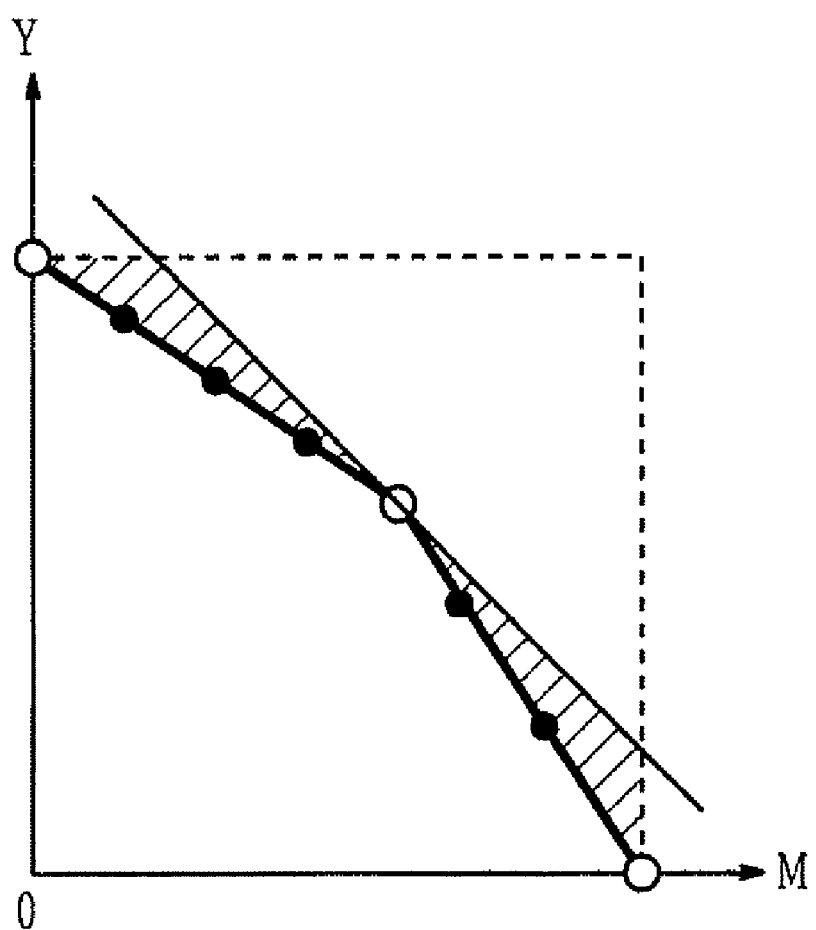
FIG. 10 is a conceptual explanatory view showing an example of reference surface points.

The second exemplary embodiment of the present invention will be described further below. FIG. 10 is a conceptual explanatory view showing an example of reference surface points. The surface points may be generated by the reference outline generating section 21 by performing the interpolation operation based on the four vertices as described in the above first exemplary embodiment. However, if the surface points venerated in this way are subject to the limitations imposed on the output device, the thus-obtained surface points may not be full-gamut surface points of the color gamut for the case where the limitations are imposed.

As an example, FIG. 10 shows a color gamut having a Y component and an M component with the total sum limitation of 180%. In FIG. 10, white circles represent vertices, and black circles represent reference surface points. In the case where the total sum limitation is 120%. using both of the two colors corresponds to 200% if each color component is 100%. Accordingly, the total sum limitation is not met. Thus, for example, the vertex is changed to a point of Y=M=60%. The reference surface points are obtained by using a vertex of Y=100% and a vertex of M=100% as they are, that is, by using four vertices (points indicated by the white circles in FIG. 10) of 0 (white point), Y=100%, M=100% and Y=M=60%. Then, reference surface points on a side between the vertex of Y=100% and the vertex of Y=M=60% and reference surface points on a side between the vertex of M=100% and the vertex of Y=M=60% are, for example, points indicated by the black circles. In this state, a color region indicated by the hatching in FIG. 10 is out of the color gamut. However this color region has a relationship where Y+M≦120 and meets the total sum limitation. Accordingly, there is a room for further expansion of the color gamut. In the second exemplary embodiment, the full gamut surface generating section 22 controls the reference surface points up to full-gamut surface points or between the full-gamut surface points and the reference surface points.

Figure 11:
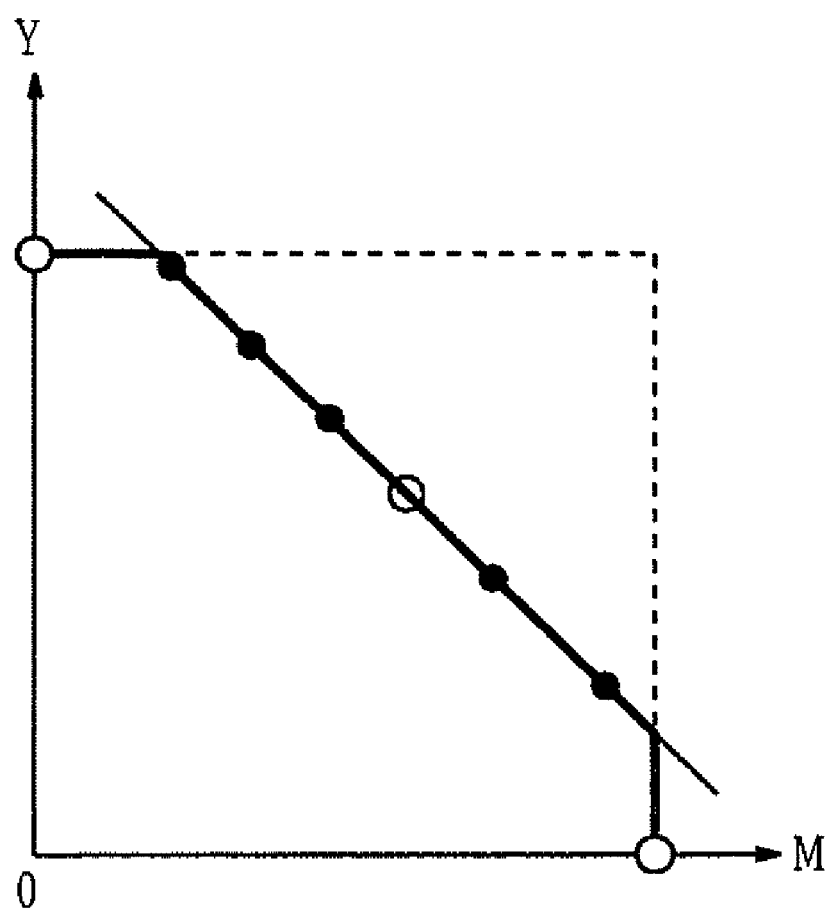
FIG. 11 is an explanatory view showing an example of full-gamut surface points generated by a full gamut surface generating section.

FIG. 11 is an explanatory view showing an example of the full-gamut surface points generated by the full gamut surface generating section 22. The full gamut surface generating section 22 obtains full-gamut surface points which meet limitations, based on the reference surface points generated by the reference outline generating section 21. Examples of the full-gamut surface points, which are obtained based on the reference surface points in FIG. 10, are indicated by black circles in FIG. 11.

Figure 12:
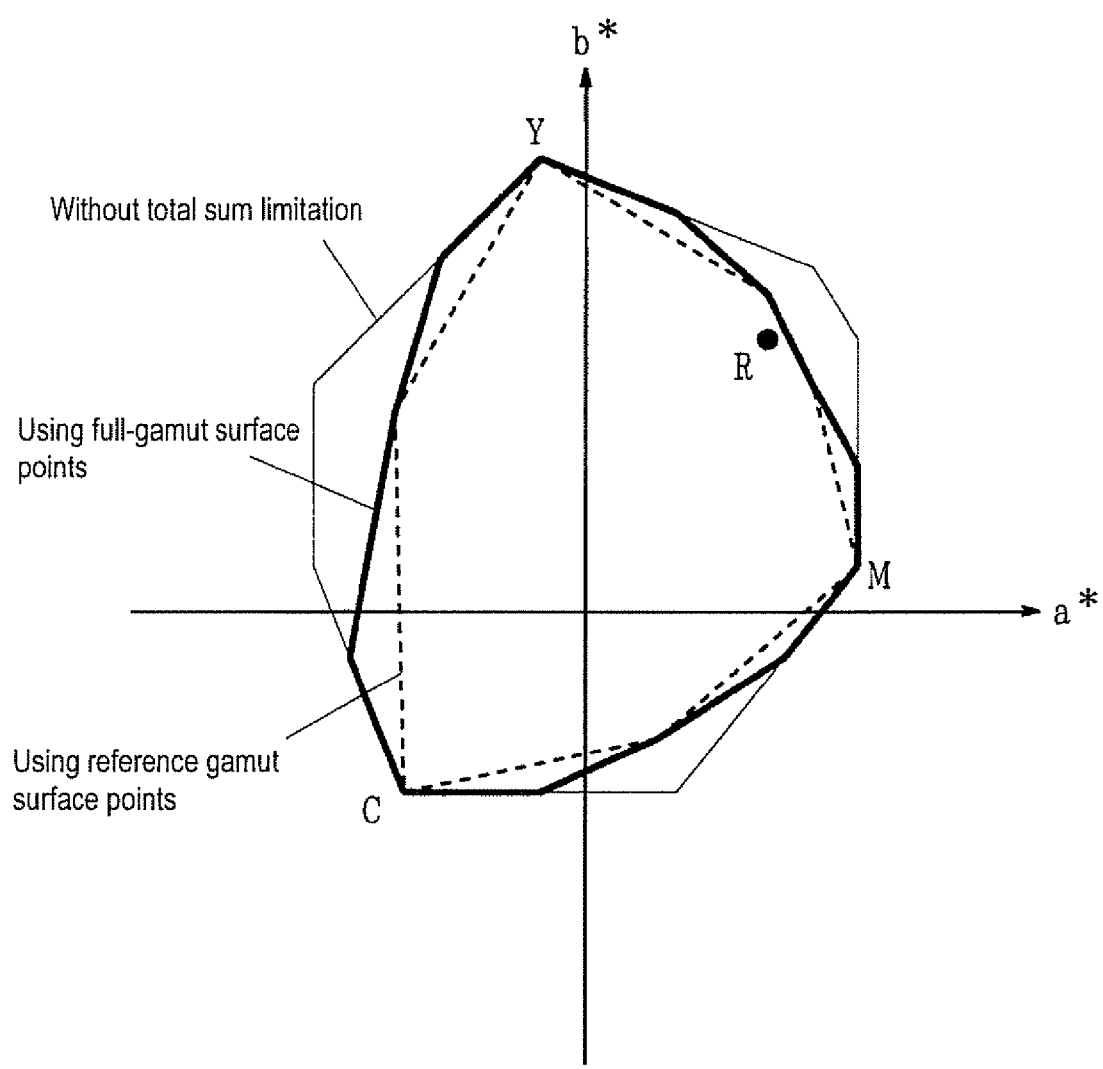
FIG. 12 is an explanatory view showing an example of a color gamut formed by the reference surface points and the fill-gamut surface points which are in a CMYKR color space.

FIG. 12 is an explanatory view showing an example of a color gamut formed by reference surface points and full-gamut surface points in a CMYKR color space. In this figure, for example, a rough outline of a color gamut converted into the LAB color space or the like is schematically shown. Specifically, FIG. 12 shows the example when viewed from the high brightness side of the L axis. In the figure, the thin solid line represents the color gamut when a total sum limitation is not imposed, the dashed line represents the color gamut which is obtained when reference surface points are used, and the thick solid line represents the color gamut which is obtained when full-gamut surface points are used. It can be seen from the figure that the color gamut, which is obtained when full-gamut surface points are used, is wider than the color gamut, which is obtained when reference surface points are used.

As described above, if the total sum limitation is below 200%, the full gamut surface generating section 22 obtains a full color gamut for the surface points not only when two colors are used but also when three or four colors are used. Of course, if the total sum limitation is in a range of 200% to 300%, reference surface points using three or four colors become objects to be processed. If the total sum limitation is in a range of 300% to 400%, reference surface points using four colors become the objects to be processed.

As a method for obtaining full-gamut surface points from reference surface points, for example, for reference surface points using four or less colors of CMYK, a ratio r satisfying the following expression is obtained $$T-K=r(C+M+Y)$$

where T denotes the total sum limitation, and C, M, Y and K denote values of the respective color components. Then, K, rC, rM and rY are set as full-gamut surface points. In this example, since K is preferential for the expansion of the color gamut, K is fixed, and C, M and Y are changed.

If a extra color is used, the extra color is also maintained (preserved). For example, for reference surface points using four colors of MYRK, a ratio r satisfying the following expression is obtained $$T-K-R=r(Y+M)$$

where T denotes the total sum limitation, and Y, M, R and K denote values of the respective colors components. Then, rY, rM, R and K are set as full-gamut surface points. In addition, since the vertices are set so as not to have plural extra colors and since the reference surface points are generates based on such vertices, there is no case where plural extra colors are maintained (preserved).

The outline control section 23 determines surface points between the above-generated reference surface points and the full-gamut surface points. How to determine the surface points may be determined in advance. For example, in CMYKR color space, assuming that reference surface points are (C0, M0, Y0, K0, R0), full-gamut surface points are (C1, M1, Y1, K1, R1) and weighting coefficients are w0 and w1 (w0+w1=1), surface points (C2, M2, Y2, K2, R2) may be determined according the following expression:

$$(C2, M2, Y2, K2, R2)=w0(C0, M0, Y0, K0, R0)+w1(C1, M1, Y1, K1, R1).$$

For example, if reference surface points are set as surface points as they are, although some surface points may be outside of the color gamut, since no concavity/convexity occurs between vertices, color continuity is excellent. In addition, if full-gamut surface points are set as surface points, the color gamut is wider than the color gamut, which is obtained when the reference surface points are used. However, as can be seen from FIG. 11, since a bending portion exists between vertices and since a tendency in color change is varied in this bending portion, color continuity is inferior. The weighing coefficients w0 and w1 may be defined considering such characteristics. Of course, the present invention is not limited to this method, but surface points may be determined between reference surface points and full-gamut surface points in other various ways. Of course, reference surface points and full-gamut surface points may be set as surface points.

The case where the total sum limitation is imposed has been described in this exemplary embodiment. However, for example, even for the cases where other limitations including a one color max value limitation are imposed, reference surface points may be obtained, full-gamut surface points meeting the imposed limitations may be obtained based on the obtained reference surface points, and surface points may be determined between the reference surface points and the full-gamut surface points.

Then, the color space converting section 13 converts the device-dependent color space into a conversion destination color space based on the surface points determined by the outline control section 23. Thus, a color gamut surface for the output device in the conversion destination color space is obtained. The obtained color gamut surface is wider than the color gamut obtained in the first exemplary embodiment.

Figure 13:
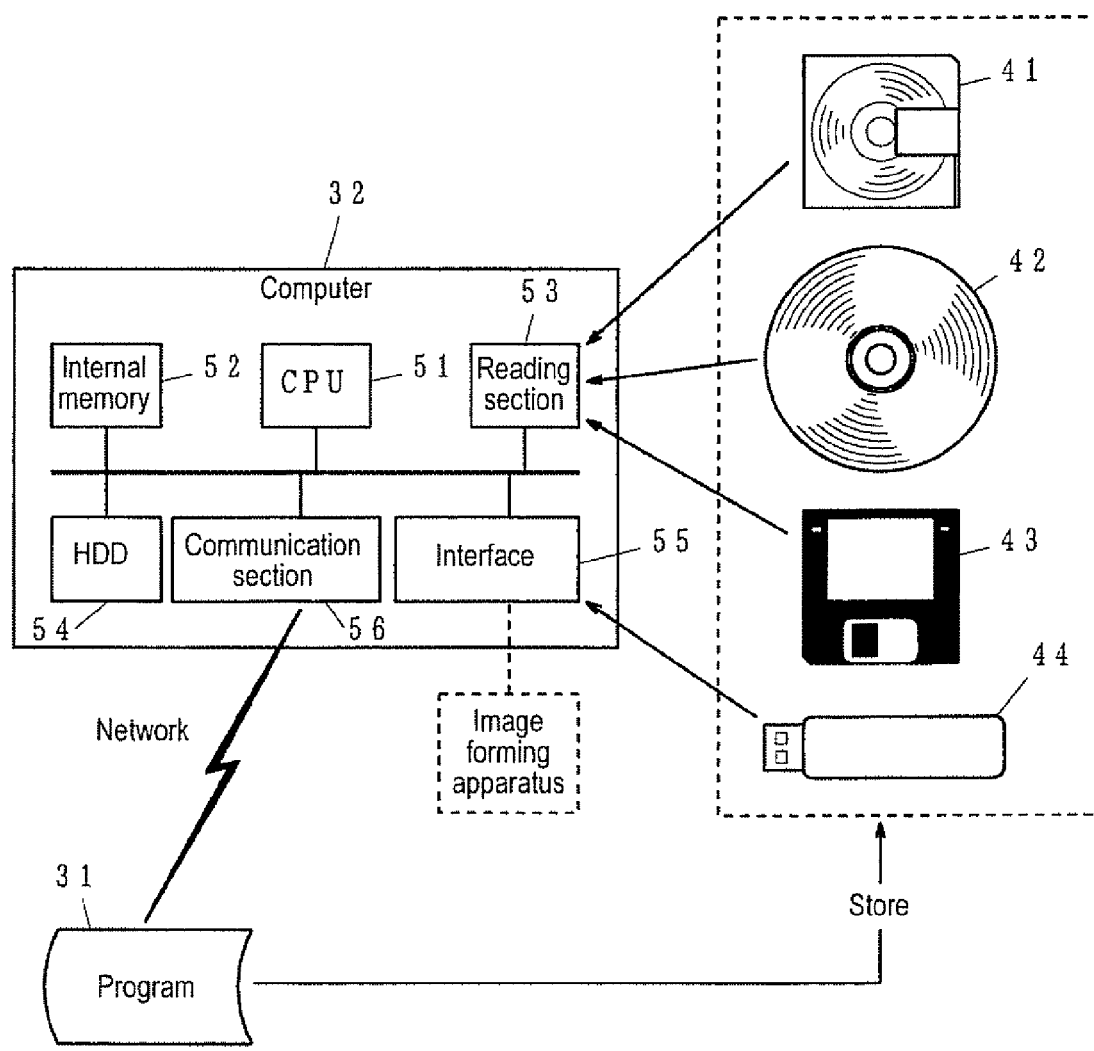
FIG. 13 is an explanatory view showing an example of a computer program when functions described in various exemplary embodiments of the present invention are implemented by the computer program, and also showing a storage medium having the computer program stored therein and a computer.
Figure 14:
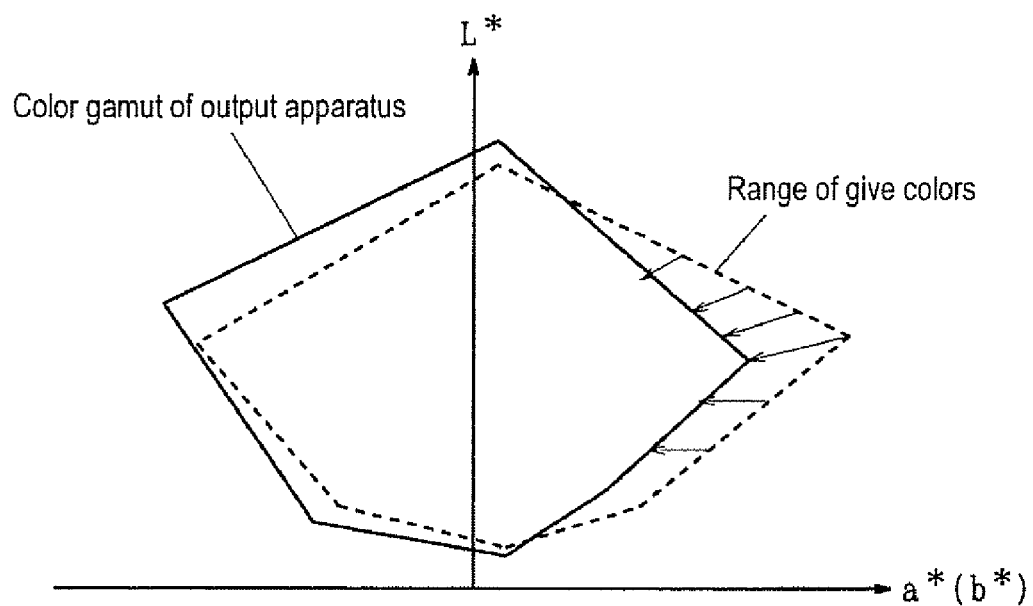
FIG. 14 is a conceptual view showing a color gamut mapping process.
Figure 15A:
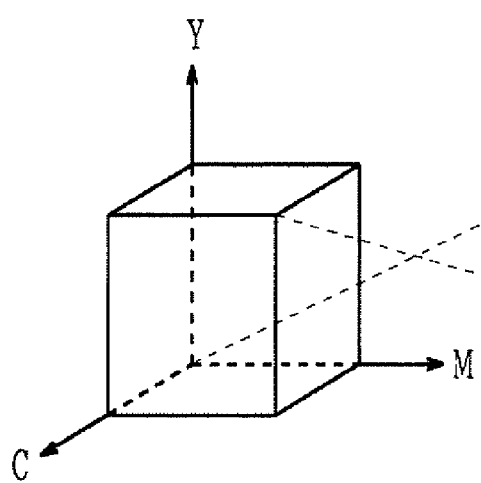
FIGS. 15A and 15B are explanatory views of examples of a color gamut surface.
Figure 15B:
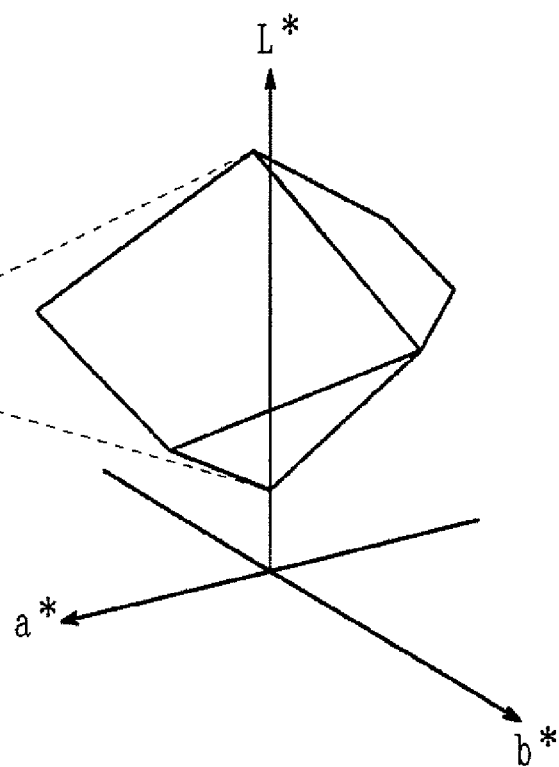
Figure 16:
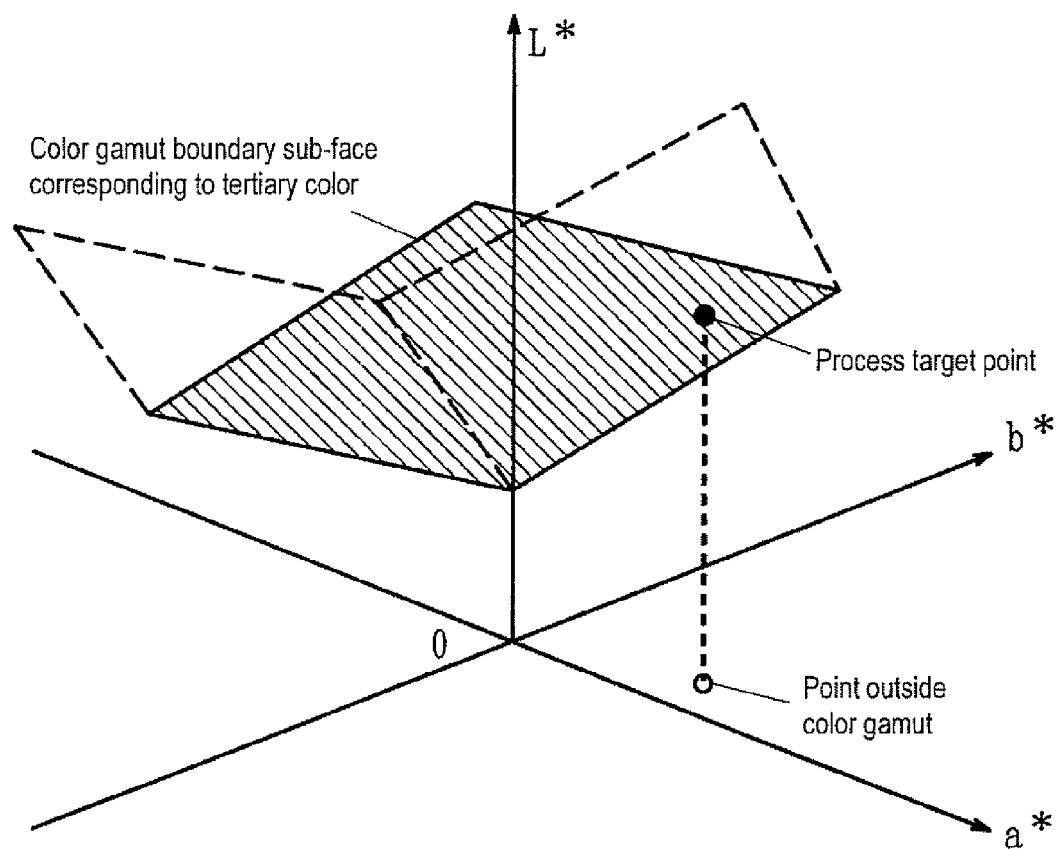
FIG. 16 is an explanatory view of a method of obtaining a color gamut surface using four colors in the LAB color space.

FIG. 13 is an explanatory view of an example of a computer program, a storage medium having the computer program stored therein, and a computer when functions described in various embodiments of the present invention are implemented by the computer program. In the figure, reference numerals 31, 32, 41, 42, 43, 44, 51, 52, 53, 54, 55 and 56 respectively denote a program, a computer, a magneto-optical disk, an optical disk, a magnetic disk, a memory, a CPU, an internal memory, a reading section, a hard disk (HDD), an interface and a communication section.

All or some of the functions of various parts described in the above embodiments of the present invention may be implemented by the program 31 executable by a computer. In this case, the program 31, data used by the program etc. may be stored in a computer readable storage medium. A storage medium is to prompt changes in energy such as magnetism, light, electricity etc. according to the description contents of the program for the reading section 53 provided in the hardware resource of the computer and deliver the description contents of the program to the reading section in the form of a signal corresponding to the changes in energy. For example, the storage medium may include the magneto-optical disk 41, the optical disk 42 (including CD, DVD, etc.), the magnetic disk 43, the memory 44 (including an IC card, a memory card, etc.) etc. Of course, these storage media are not limited to transportable types.

By storing the program 31 in the storage media and loading the storage media into, for example, the reading section 53 or the interface 55 of the computer 32 and also by reading the program 31 from the computer, storing the program in the internal memory 52 or the hard disk 54 and executing the program 31 by the CPU 51, all or some of the functions described in the above embodiments of the present invention can be implemented. Alternatively, the functions may be implemented by transmitting the program 31 to the computer 32 via a communication path, receiving the program 31 in the communication section 56 of the computer 32, storing it in the internal memory 52 or the hard disk 54, and executing the program 31 by the CPU 51.

In addition, the computer 32 may be connected to other various devices via the interface 55. For example, the computer 32 may be connected to a display device for displaying information, a receiving device for receiving information from users etc. Further, for example, it may be configured so that the computer 32 is connected to an image forming apparatus as an output device via the interface 55 and an image is formed in the image forming apparatus by performing a color gamut mapping process and other color processes using a generated color gamut surface.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color gamut surface generating apparatus comprising: a vertex generating unit, wherein
    a device-dependent color space has axes of (i) four basic colors including black and (ii) at least one extra color, which are used in color output by an output device, and
    the vertex generating unit generates, in the device-dependent color space, vertices of each of a plurality of sub-surfaces constituting a surface of a color gamut by selecting
        (a) at least one color gamut each of which is output by the output device using a combination of three of the basic colors and one, corresponding to each color gamut, of the at least one extra color, and
        (b) a color gamut which is output by the output device using the four basic colors,
    wherein the vertex generating unit does not generate a vertex of all colors constituting the device-dependent color space; and
    a gamut surface generating unit that generates surface points existing on the surface of the color gamut constituted by the vertices.

2. The color gamut surface generating apparatus according to claim 1, wherein the vertex generating unit generates the vertices so that a sum of color components which are elements of each vertex does not exceed a total sum limitation which is a limitation imposed on the output device.

3. The color gamut surface generating apparatus according to claim 1, wherein the vertex generating unit generates the vertices so that a sum of color components which are elements of each vertex does not exceed a one color max value limitation which is a limitation imposed on the output device.

4. The color gamut surface generating apparatus according to claim 2, wherein the vertex generating unit generates the vertices so that a sum of color components which are elements of each vertex does not exceed a one color max value limitation which is a limitation imposed on the output device.

5. The color gamut surface generating apparatus according to claim 1, wherein
    the gamut surface generating unit includes
        a reference gamut surface generating unit that generates reference surface points on the sub-faces constituted by the vertices,
        a full gamut surface generating unit that generates, based on the reference surface points, full-gamut surface points which are points on the surface of the color gamut and which meet the limitation imposed on the output device, and
    an outline control unit that sets, as the surface points, (i) the full-gamut surface points or (ii) points between the full-gamut surface points and the reference surface points.

6. The color gamut surface generating apparatus according to claim 2, wherein
    the gamut surface generating unit includes
        a reference gamut surface generating unit that generates reference surface points on the sub-faces constituted by the vertices,
        a full gamut surface generating unit that generates, based on the reference surface points, full-gamut surface points which are points on the surface of the color gamut and which meet the limitation imposed on the output device, and
    an outline control unit that sets, as the surface points, (i) the full-gamut surface points or (ii) points between the full-gamut surface points and the reference surface points.

7. The color gamut surface generating apparatus according to claim 3, wherein
    the gamut surface generating unit includes
        a reference gamut surface generating unit that generates reference surface points on the sub-faces constituted by the vertices,
        a full gamut surface generating unit that generates, based on the reference surface points, full-gamut surface points which are points on the surface of the color gamut and which meet the limitation imposed on the output device, and
    an outline control unit that sets, as the surface points, (i) the full-gamut surface points or (ii) points between the full-gamut surface points and the reference surface points.

8. The color gamut surface generating apparatus according to claim 1, further comprising:

a color space converting unit that converts the vertices and the surface points into points of a conversion destination color space other than the device-dependent color space.

9. The color gamut surface generating apparatus according to claim 2, further comprising:

a color space converting unit that converts the vertices and the surface points into points of a conversion destination color space other than the device-dependent color space.

10. The color gamut surface generating apparatus according to claim 3, further comprising:

a color space converting unit that converts the vertices and the surface points into points of a conversion destination color space other than the device-dependent color space.

11. A non-transitory computer-readable medium storing a program that causes a computer to execute a color gamut surface generating process, wherein a device-dependent color space has axes of (i) four basic colors including black and (ii) at least one extra color, which are used in color output by an output device the process comprises:

generating, in the device-dependent color space, vertices of each of a plurality of sub-faces constituting a surface of a color gamut by selecting (a) at least one color gamut each of which is output by the output device using a combination of three of the basic colors and one, corresponding to each color gamut, of the at least one extra color, and (b) a color gamut which is output by the output device using the four basic color, wherein the vertex generating unit does not generate a vertex of all colors constituting the device-dependent color space; and generating surface points existing on the surface of the color gamut constituted by the vertices.

12. The non-transitory computer-readable medium according to claim 11, wherein the generating of the vertices generates the vertices so that a sum of color components which are elements of each vertex does not exceed a total sum limitation which is a limitation imposed on the output device.

13. The non-transitory computer-readable medium according to claim 11, wherein the generating of the vertices generates the vertices so that a sum of color components which are elements of each vertex does not exceed a one color max value limitation which is a limitation imposed on the output device.

14. The non-transitory computer-readable medium according to claim 12, wherein the generating of the vertices generates the vertices so that a sum of color components which are elements of each vertex does not exceed a one color max value limitation which is a limitation imposed on the output device.

15. The non-transitory computer-readable medium according to claim 11, wherein the generating of the surface points includes generating reference surface points on the sub-faces constituted by the vertices, generating, based on the reference surface points, full-gamut surface points which are points on the surface of the color gamut and which meet the limitation imposed on the output device, and setting, as the surface points, (i) the outermost surface points or (ii) points between the full-gamut surface points and the reference surface points.

16. The non-transitory computer-readable medium according to claim 12, wherein the generating of the surface points includes generating reference surface points on the sub-faces constituted by the vertices, generating, based on the reference surface points, full-gamut surface points which are points on the surface of the color gamut and which meet the limitation imposed on the output device, and setting, as the surface points, (i) the outermost surface points or (ii) points between the full-gamut surface points and the reference surface points.

17. The non-transitory computer-readable medium according to claim 13, wherein the generating of the surface points includes generating reference surface points on the sub-faces constituted by the vertices, generating, based on the reference surface points, full-gamut surface points which are points on the surface of the color gamut and which meet the limitation imposed on the output device, and setting, as the surface points, (i) the outermost surface points or (ii) points between the full-gamut surface points and the reference surface points.

18. The non-transitory computer-readable medium according to claim 11, wherein the process further comprises:

converting the vertices and the surface points into points of a conversion destination color space other than the device-dependent color space.

19. The non-transitory computer-readable medium according to claim 12, wherein the process further comprises:

converting the vertices and the surface points into points of a conversion destination color space other than the device-dependent color space.

20. The non-transitory computer-readable medium according to claim 13, wherein the process further comprises:

converting the vertices and the surface points into points of a conversion destination color space other than the device-dependent color space.

* * * * *